Feb. 25, 1969  H. B. STERN  3,429,443
FLUID VELOCITY DECELERATION DEVICE
Filed July 8, 1966
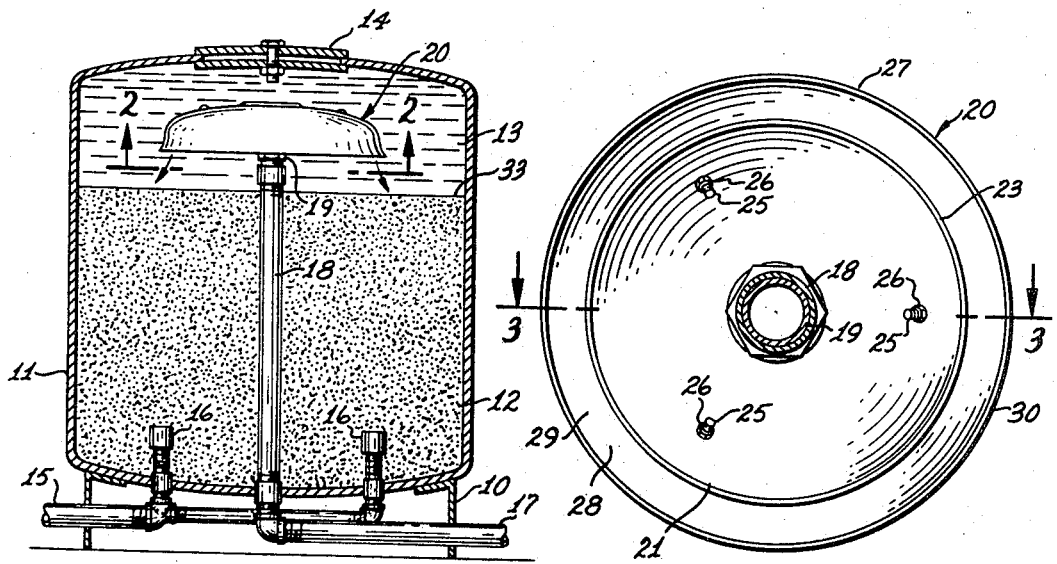
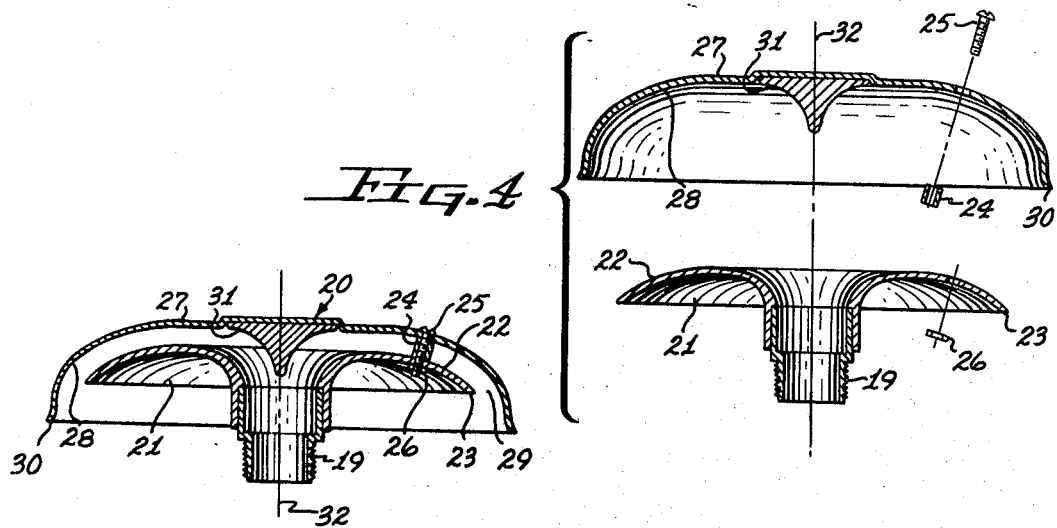
INVENTOR.
HOWARD B. STERN
BY
Willard S. Brown
ATTORNEY

United States Patent Office 3,429,443
Patented Feb. 25, 1969

3,429,443
FLUID VELOCITY DECELERATION DEVICE
Howard B. Stern, 207 W. Clarendon Ave.,
Phoenix, Ariz. 85013
Filed July 8, 1966, Ser. No. 563,841
U.S. Cl. 210—288    3 Claims
Int. Cl. B01d 35/00

ABSTRACT OF THE DISCLOSURE

A water filter with a mushroom-shaped fluid flow control device on the upper end of the inlet conduit to smooth the flow at the inlet and thereby reduce agitation in the filter.

This invention pertains to fluid flow control devices and is particularly directed to a fluid velocity deceleration device for the upper distribution of water in a swimming pool filter mechanism.

One of the objects of this invention is to provide a fluid velocity deceleration device for the top end of an inflow stand pipe submerged in a fluid tank.

Still another object of this invention is to provide a water velocity deceleration device for the upper distribution of water in a swimming pool filter and the like.

It is also an object of this invention to provide an improved water velocity deceleration device for the upper end of the inflow stand pipe of water filter which allows the inflow water to merge with the liquid in the filled tank so as to prevent disturbance or turbulence affecting the filter sand and other filtering media within the fluid filter tank.

Still another object of this invention is to provide a water velocity deceleration device with a top end of an inflow stand pipe which decelerates and reverses the flow downwardly from the top of the pipe in a smooth non-turbulent manner particularly when the deceleration device is totally submerged in the fluid.

Still another object of this invention is to provide a fluid velocity deceleration device which is simple in construction, durable and easily installed, maintained and serviced.

Further features of this invention will appear from a detailed description of the drawings in which:

FIG. 1 is a cross section through a typical water filter device incorporating the features of this invention.

FIG. 2 is an enlarged bottom view of the water velocity deceleration device having the features of this invention on line 2—2 of FIG. 1.

FIG. 3 is an enlarged sectional view on the line 3—3 of FIG. 2.

FIG. 4 is an exploded view in section showing the parts forming the elements of this invention.

As an example of one embodiment of the invention there is shown a water filter for a swimming pool and the like having a base 10 supporting a tank portion 11 containing the filter medium such as sand 12 above which is the space 13 above which is a suitable access closure cover 14 for servicing the interior of the tank 11. A discharge pipe 15 is connected to suitable filters 16 imbedded in the filter materials 12 for receiving and delivering the filtered water from the unit.

An input water line 17 has an upwardly extending pipe 18 which is connected to the threaded lower intake end 19 of the water velocity deceleration device of this invention. A mushroom-shaped flow control element indicated generally at 20 comprising a lower element 21 having a centrally located passageway connecting with the top of the vertical pipe 18 and having an annular French curve shaped upper surface 22 extending upwardly and radially outwardly and downwardly terminating in the discharge lip 23. Spaced above the surface 22 by the spacer bushings 24 and secured to the lower element 21 by the bolts 25 and nuts 26 is the upper water control element 27 having an underside surface 28 substantially the configuration of the surface 22 of the lower element 21 so as to form an annular passageway 29 extending upwardly from the pipe 18 and then radially outwardly and downwardly terminating at the discharge lip 30, which lip is preferably below the lip 23 of the lower and inside element 21. A conical-shaped flow smoothing element 31 is fixed centrally of the underside surface 28 of the upper element 27 having its vertical axis 32 coinciding with the axis of the pipe 18.

In operation: the flow control unit 20 is totally submerged in the liquid in the space 13 above the filter sand 12 and water is flowing up through the pipe 18 against the conical flow control element 31 and then radially outwardly and downwardly through the passageway 29 discharging out past the lips 23 and 30 at a reduced soft even flow downwardly to the filter sand top surface 33. The sand surface 33 is thus not disturbed nor stirred up since the flow out through the passageway, which becomes larger and larger in volume and area as the flow moves radially outwardly in passageway 29, so as to decrease flow velocity and eliminate turbulence of the liquid flow before it strikes the sand surface 33. This results in high efficiency and long life for the filter sand performance avoiding channeling, dishing, cratering, and disturbance of the flat filter bed surface 33 and prevents water running down the sides between the sand and walls of the filter, with minimum turbulence so as not to disturb the surface 33 of the sand 12.

During backwashing as when water flow is reversed with the water coming in through the pipe 15 and discharging out through the pipe 18, water flows upwardly from the top of the filter bed of sand 12 and is caught by the lip 30 of the top element 27 and flows slowly at first radially inwardly in the passageway 29 with minimum turbulence so as not to disturb the surface 33 of the sand 12, and then finally accelerates to full velocity as it enters the pipe 17.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A water filter fluid velocity deceleration device comprising in combination:
   (A) a tank,
   (B) a filter medium within the tank having a space above the filter medium,
   (C) a discharge pipe imbedded in the filter medium adjacent the bottom portion of the tank,
   (D) an input water line with an upwardly extending pipe having a top end opening in the space above the filter medium,
   (E) a flow control element having a lower intake end arranged to be supported on the top end of the input water line,
   (F) a mushroom-shaped lower flow control element fixed to the lower intake end having a french curve shaped upper surface extending radially outwardly and downwardly of the input pipe,
   (G) and an upper fluid control element mounted on and spaced above the lower flow control element having an underside surface conforming to the configuration of the upper surface of the lower flow control element so as to form an annular passageway extending upwardly and then radially outwardly and downwardly from said lower intake end.

2. In a fluid velocity deceleration device as set forth in claim 1 wherein said upper surface of the lower flow control element terminates in a lip at its outer periphery and the upper fluid control element terminates in a lip located radially outwardly of and below the lip of the lower flow control element.

3. In a fluid velocity deceleration device as set forth in claim 1 wherein the upper fluid control element includes a conical flow smoothing element fixed to the underside surface of the upper flow control element having its axis aligned with the axis of the lower intake end.

References Cited

UNITED STATES PATENTS

| | | | |
|---|---|---|---|
| 2,101,234 | 12/1937 | Becher | 239—524 XR |
| 2,174,598 | 10/1939 | Quick et al. | 138—37 |

FOREIGN PATENTS

| | | |
|---|---|---|
| 1,169,419 | 5/1964 | Germany. |
| 59,134 | 3/1938 | Norway. |
| 460,122 | 10/1950 | Italy. |

LAVERNE D. GEIGER, *Primary Examiner.*

BRADFORD E. KILE, *Assistant Examiner.*

U.S. Cl. X.R.

138—39; 210—456